(12) United States Patent
Gray, Jr. et al.

(10) Patent No.: US 7,252,020 B2
(45) Date of Patent: Aug. 7, 2007

(54) VEHICLE DRIVE-TRAIN INCLUDING A CLUTCHLESS TRANSMISSION, AND METHOD OF OPERATION

(75) Inventors: Charles L. Gray, Jr., Pinckney, MI (US); Daniel W. Barba, New Hudson, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 173 days.

(21) Appl. No.: 11/173,566

(22) Filed: Jul. 1, 2005

(65) Prior Publication Data

US 2005/0241437 A1 Nov. 3, 2005

Related U.S. Application Data

(63) Continuation-in-part of application No. 10/769,459, filed on Jan. 30, 2004, which is a continuation-in-part of application No. 10/620,726, filed on Jul. 15, 2003, which is a continuation-in-part of application No. 09/479,844, filed on Jan. 10, 2000, now Pat. No. 6,719,080.

(51) Int. Cl.
*F16H 47/00* (2006.01)
(52) U.S. Cl. .................................. 74/732.1
(58) Field of Classification Search ............. 74/730.1, 74/731.1, 732.1
See application file for complete search history.

(56) References Cited

U.S. PATENT DOCUMENTS

| | | | |
|---|---|---|---|
| 3,826,152 A | 7/1974 | Alexeev et al. | 74/424.5 |
| 4,663,713 A | 5/1987 | Cornell et al. | 364/424.1 |
| 4,766,779 A * | 8/1988 | Massy | 74/731.1 |
| 4,913,003 A | 4/1990 | Tervola | 475/121 |
| 4,939,954 A * | 7/1990 | Walzer et al. | 74/733.1 |
| 5,108,352 A | 4/1992 | Pires | 475/170 |
| 5,323,737 A | 6/1994 | Farrell | 123/18 A |
| 5,352,162 A | 10/1994 | Coronel | 475/169 |
| 5,394,771 A | 3/1995 | Schroder | 74/661 |
| 5,505,113 A | 4/1996 | Wiest | 74/733.1 |
| 5,678,405 A | 10/1997 | Folsom | 60/488 |
| 5,678,463 A * | 10/1997 | Brambilla et al. | 74/733.1 |

(Continued)

FOREIGN PATENT DOCUMENTS

EP 0 657 322 A1 6/1995

(Continued)

*Primary Examiner*—Dirk Wright
(74) *Attorney, Agent, or Firm*—Seed IP Law Group, PLLC

(57) ABSTRACT

A vehicle drive-train includes a drive-motor having an output shaft and a transmission having an input shaft, an output shaft, a plurality of discrete forward gear ratios and a corresponding plurality of synchronizers. Each of the synchronizers is configured to mechanically synchronize rotation of the drive-motor output shaft with the transmission output shaft according to a value of a selected gear ratio, during shifting of the transmission to the selected gear ratio. The output shaft of the drive-motor and the input shaft of the transmission are coupled together such that, during normal operation of the drive-train, rotation of the output shaft of the drive-motor results in a proportionate and uninterrupted rotation of the input shaft of the transmission.

34 Claims, 6 Drawing Sheets

U.S. PATENT DOCUMENTS

| | | | |
|---|---|---|---|
| 5,884,201 A | 3/1999 | Kawai | 701/22 |
| 5,887,674 A | 3/1999 | Gray, Jr. | 180/307 |
| 5,951,436 A | 9/1999 | Kim | 477/20 |
| 6,010,423 A | 1/2000 | Jolliff et al. | 475/93 |
| 6,019,697 A | 2/2000 | Colletti | 475/303 |
| 6,202,016 B1 | 3/2001 | Stephenson et al. | 701/51 |
| 6,250,180 B1 * | 6/2001 | Legner et al. | 74/733.1 |
| 6,272,950 B1 | 8/2001 | Braun et al. | 74/731.1 |
| 6,336,518 B1 | 1/2002 | Matsuyama | 180/306 |
| 6,374,702 B1 * | 4/2002 | Scheid et al. | 74/730.1 |
| 6,719,080 B1 | 4/2004 | Gray, Jr. | 180/165 |
| 6,834,737 B2 * | 12/2004 | Bloxham | 180/165 |
| 2003/0232679 A1 | 12/2003 | Cole | 475/7 |
| 2004/0127321 A1 | 7/2004 | Morscheck | 475/210 |
| 2004/0173089 A1 | 9/2004 | Gray, Jr. et al. | 91/505 |
| 2004/0251067 A1 | 12/2004 | Gray, Jr. et al. | 180/165 |
| 2005/0193888 A1 | 9/2005 | Gray, Jr. | 91/472 |

FOREIGN PATENT DOCUMENTS

| | | |
|---|---|---|
| GB | 1148609 | 4/1969 |

* cited by examiner

VEHICLE DRIVE-TRAIN INCLUDING A CLUTCHLESS TRANSMISSION, AND METHOD OF OPERATION

CROSS-REFERENCE TO RELATED APPLICATIONS

This application is a continuation-in-part of U.S. patent application Ser. No. 10/769,459, entitled HYDRAULIC HYBRID VEHICLE WITH INTEGRATED HYDRAULIC DRIVE MODULE AND FOUR-WHEEL-DRIVE, AND METHOD OF OPERATION THEREOF, filed Jan. 30, 2004, now pending, which incorporates by reference and is a continuation-in-part of U.S. patent application Ser. No. 10/620,726, entitled OPPOSING PUMP/MOTORS, filed Jul. 15, 2003, which incorporates by reference and is a continuation-in-part of U.S. patent application Ser. No. 09/479,844, entitled HYDRAULIC HYBRID VEHICLE, filed Jan. 10, 2000, now U.S. Pat. No. 6,719,080, issued Apr. 13, 2004, all of which applications/patents are incorporated herein by reference in their entirety.

BACKGROUND OF THE INVENTION

1. Field of the Invention

The invention described herein is generally related to vehicle transmission systems, and in particular, to clutchless transmissions.

2. Description of the Related Art

FIG. 1 shows a diagrammatic representation of a typical vehicle 100 and drive-train 101. An internal combustion engine 102 provides rotational energy to an engine output shaft 104, which is coupled to the wheels 106 to provide motive power to the vehicle 100. The engine 102 operates in a range of around 1,000 to 6,000 rpms, and delivers the highest power and efficiency within a much smaller range.

Because the optimum operating range of the engine 102 is limited, a transmission 108 is employed to change a coupling ratio between the output shaft 104 and the wheels 106. Gears internal to the transmission 108 are coupled in various configurations to achieve several different coupling ratios so that the vehicle 100 can operate over a wide range of speeds while the engine 102 remains substantially within its optimum range of rpms.

The engine 102 comprises many moving parts, including pistons, valves, camshaft, flywheel, etc. During operation, the engine 102 develops a high degree of output inertia due to the mass of the moving parts. At the same time, the vehicle develops inertia of its own as it travels at speed. If the engine 102 were directly coupled to the transmission 108, a change of coupling ratios would require an instantaneous change in the rotational speed of the engine 102 or the speed of the vehicle 100, or a combination of both. The sudden torque load of such an instantaneous transition would be devastating to the entire drive-train 101, and extremely uncomfortable to vehicle occupants. Additionally, if the engine were directly coupled to the transmission, it would be impossible to stop the vehicle 100 without shutting down the engine 102.

In order to permit gear changes that are tolerable to the vehicle and occupants, a clutch 110 is employed to provide torque compensation between the engine 102 and the transmission 108. The clutch interrupts the torque from the engine 102 while the gears are changed, then engages the engine 102 to the transmission 108 gradually so that the speed of the engine 102 can adapt to the speed of the vehicle 100, as translated through the new gear ratio.

Various types of clutches are known, including dry clutches and fluid clutches. A torque converter is a type of fluid clutch typically employed in automatic-transmission vehicles, while standard transmission vehicles generally use a diaphragm clutch 110, as illustrated in FIG. 2.

The clutch 110 of FIG. 2 includes a flywheel 122 coupled to an output shaft 104 of an engine. The output shaft may be, for example, the crank shaft of an internal combustion engine. The clutch 110 further includes a clutch plate 130, a pressure plate 128, a diaphragm spring 126, a cover 124, studs 136, and a throw-out bearing 134. The clutch plate 130 is coupled to a transmission input shaft 132.

The flywheel 122, clutch cover 124, diaphragm spring 126, and pressure plate 128 all rotate with the engine output shaft 104. The clutch plate 130 is rigidly coupled to the input shaft 132 of the transmission 108. When the throw-out bearing 134 presses against the diaphragm spring 126, it pivots on studs 136 linking the spring 126 to the cover 124, and lifts the pressure plate 128 from the clutch plate 130, disengaging the engine 102 from the transmission 108 (as shown in FIG. 2). When fully disengaged, the transmission 108 can change gears or the vehicle 100 can come to a stop without affecting the rotation of the engine 102.

As the bearing 134 withdraws, the spring 126 presses the pressure plate 128 against the clutch plate 130 with progressively greater force. Torque from the engine 102 is gradually transferred to the transmission 108 as friction increases between the plates 128, 130, until the transmission 108 and the engine 102 are again fully and rigidly coupled.

The clutch plate 130 has some output inertia of its own, which is typically compensated for during gear changes by synchronizers in the transmission 108.

BRIEF SUMMARY OF THE INVENTION

According to one embodiment of the invention, a vehicle drive-train is provided, comprising a drive-motor having an output shaft and a transmission having an input shaft, an output shaft, a plurality of discrete forward gear ratios and a corresponding plurality of synchronizers, each of the synchronizers configured to mechanically synchronize rotation of the drive-motor output shaft with the transmission output shaft according to a value of a respective one of the gear ratios during shifting of the transmission to the respective gear ratio. The output shaft of the drive-motor and the input shaft of the transmission are coupled together such that, during normal operation of the drive-train, rotation of the output shaft of the drive-motor results in a proportionate and uninterrupted rotation of the input shaft of the transmission. The coupling of the output shaft of the drive-motor and the input shaft of the transmission may be in the form of a unitary shaft comprising both the output shaft of the drive-motor and the input shaft of the transmission.

Alternatively, the coupling may be a reducing gear set or a splined engagement, for example. Additionally, the drive-motor may be a hydraulic motor, such as a pump/motor, or an electric motor.

According to another embodiment, a method of operation is provided, including removing torque from an output shaft of a drive-motor, disengaging a first set of gears having a first forward gear ratio, moving a second set of gears having a second forward gear ratio toward engagement, and, during the moving step, bringing first and second frictional synchronizing surfaces in the transmission into contact such that rotation of the output shaft of the drive-motor is synchronized with an output shaft of the transmission, according to the second gear ratio.

BRIEF DESCRIPTION OF THE SEVERAL VIEWS OF THE DRAWINGS

In the drawings, identical reference numbers identify similar elements or acts.

DETAILED DESCRIPTION OF THE INVENTION

Figure 1:
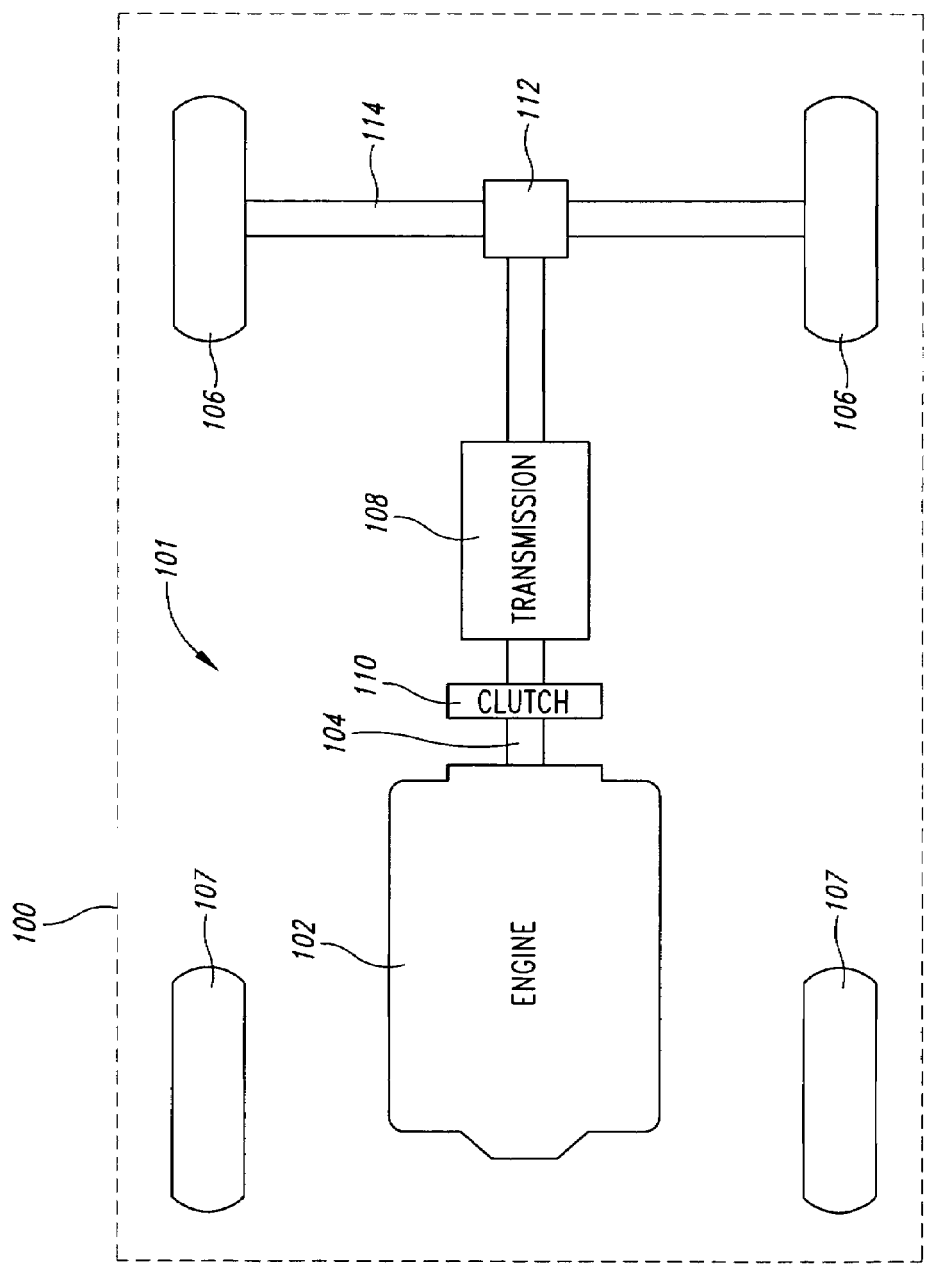
FIG. 1 is a diagrammatical representation of a vehicle according to known art.
Figure 2:
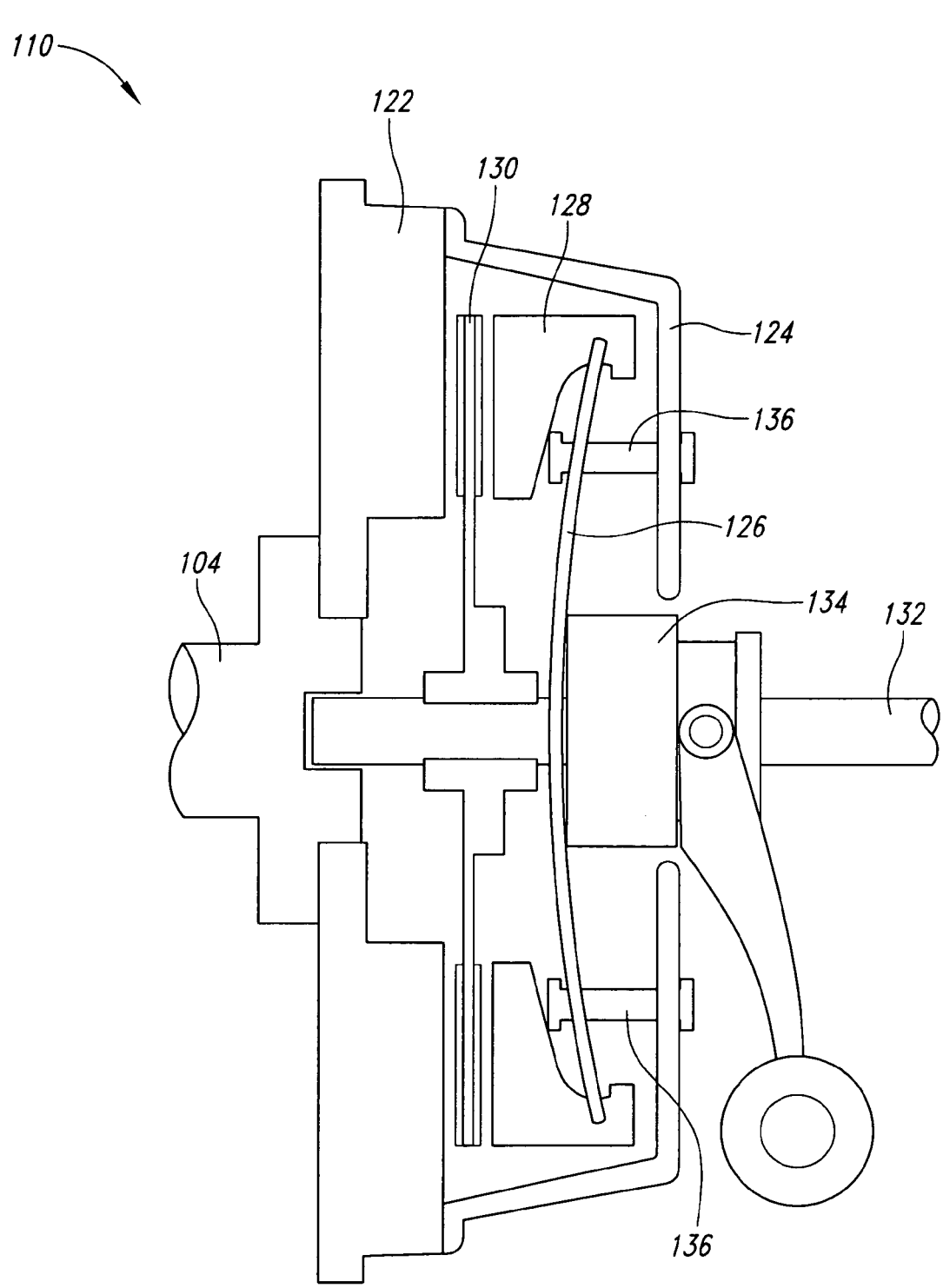
FIG. 2 is a diagram of a typical diaphragm spring type clutch according to known art.

In the following description, certain specific details are set forth in order to provide a thorough understanding of various embodiments of the invention. However, one skilled in the art will understand that the invention may be practiced without these details.

With the recent development of hybrid vehicles and alternative drive-motors, the issues that led to the development of modern clutches are changing. For example, in some hybrid vehicles, an internal combustion engine generates power that is used by a separate drive-motor, such as a hydraulic or electric motor, and is not mechanically coupled to the drive-train of the vehicle.

As is well known, electric and hydraulic motors do not need to run continually for effective operation, and thus may be allowed to come to a complete stop when an associated vehicle stops. However, the issue of compensation of inertia during gear shifting still remains. There are several proposed shifting methods that allow gear shifting without a clutch.

One such proposal incorporates a continuously variable transmission (CVT), which allows the transmission ratio between the drive-motor and the drive wheels to be changed constantly, according to load and speed. Thus, the motor is never disengaged from the transmission, and no inertia compensation is necessary. However, current CVT technology presents issues of affordability, and lacks ideal torque transfer capacity and robustness.

Another proposal provides a shifting method in which, during a shifting event, power is removed from the drive-motor and the transmission is moved to neutral; sensors measure the rotation speeds of the output shaft of the drive-motor and output shaft of the transmission; a target speed of the motor shaft is calculated, based on the current rotation speed of the output shaft of the transmission, the transmission ratios of the current gear and a target gear, and ratios of any other fixed gear exchanges in the drive-train; a controller applies power to the drive-motor to bring its output shaft to the target speed; once the rotation speeds of the output shaft of the drive-motor and output shaft of the transmission are synchronized in accordance with the calculation, the transmission is moved to the target gear; and finally, power is reapplied to the drive-motor to an appropriate level, according to the load, speed, and accelerator pedal position.

This solution is subject to some practical complications, and has not been widely implemented in the industry. For example, when the transmission is shifted to neutral, there is virtually no load on the motor. Thus, when power is applied to the motor to bring it to the target rotation speed, the motor will tend to over-rev and shoot past the target speed. In the case of a motor having the output torque capability necessary to drive a motor vehicle, very little power is required to drive the motor to very high revolutions, while the motor is unloaded. The inventors have determined that it is very difficult, even under control of a computer module, to bring the motor speed quickly and accurately to the target speed.

Another problem is that, when the motor is shifted from a low gear to a higher gear, the target speed will be slower than the current rotation speed of the motor, which may slow only gradually. Thus, either the shifting will be delayed until the motor slows to the target speed or reverse power must be applied to the motor to quickly slow it, which will again be prone to overshooting the target.

Finally, the steps of the shifting method described require very accurate timing for effective implementation, and thus must be performed by an automatic control system that controls power to the motor during shifting, as well as actuation of the gear shift. For this reason, even if the system were effective and practical, it could not be implemented in manual transmission vehicles, which are shifted under the control of the vehicle operators.

Figure 3:
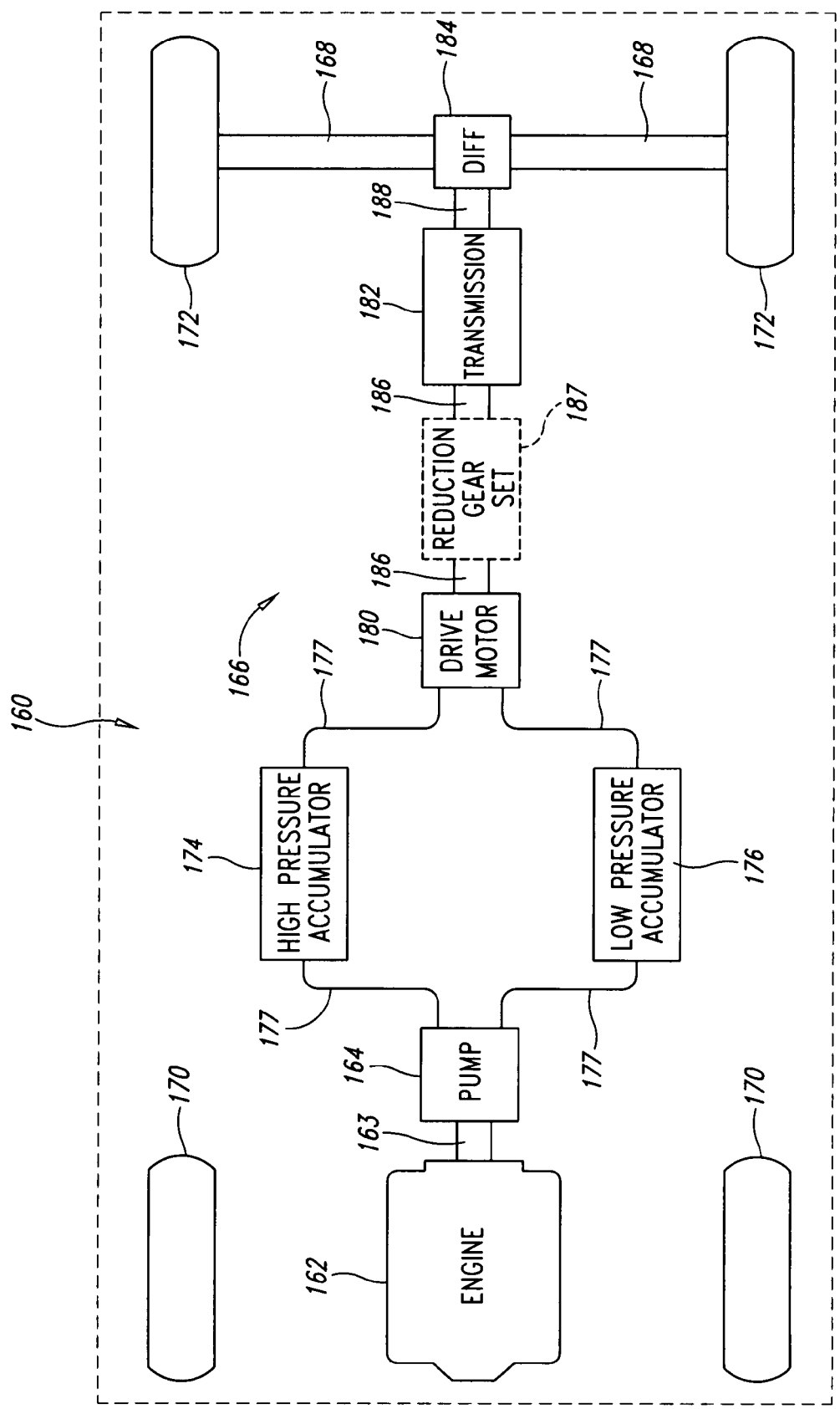
FIG. 3 is a diagrammatical representation of a vehicle according to an embodiment of the invention.

FIGS. 3-5 illustrate a first embodiment of the invention. FIG. 3 diagrammatically illustrates a hybrid vehicle 160 according to an embodiment of the invention. The vehicle 160 includes a drive-train 166 comprising a drive-motor 180, a transmission 182, coupling shaft 186, transmission output shaft 188, differential 184, drive axles 168, and drive wheels 172. According to an alternate embodiment, a reducing gear set 187, shown in dashed lines in FIG. 3, is provided between the drive motor 180 and the transmission 182 such that an input shaft of the transmission 182 rotates at a ratio that is less than 1:1 with respect to rotation of an output shaft of the drive-motor 180. The vehicle 160 further includes an engine 162, such as an internal combustion engine, an engine output shaft 163, a pump 164, and non-drive wheels 170. Hydraulic lines 177 provide hydraulic connections between the pump 164 and high- and low-pressure accumulators 174, 176, and between the high- and low-pressure accumulators 174, 176 and the drive-motor 180.

Functionally, an output of the drive-motor 180 and an input of the transmission 182 are coupled such that, during normal operation of the drive-train 166, rotation of the output of the drive-motor 180 results in a proportionate and uninterrupted rotation of the input of the transmission 182. Such a coupling may be via a common shaft, or may employ any other appropriate coupling. For example, the drive-motor 180 and the transmission 182 may have separate shafts that are directly coupled, such as via a splined engagement, for example, or coupled via gear linkages, such as, for example, reduction gear set 187. It will be understood that the coupling illustrated can comprise any such coupling. Similarly, the transmission output shaft 188 shown as coupling the transmission and the differential may also comprise a separate drive line, or one or more universal joints, etc.

The term "normal operation of the drive-train," as used above, refers to typical driving operations, such as starting and stopping, shifting gears while a vehicle is in motion, acceleration, braking, cruising at speed, etc. It will be recognized that some vehicles may include a means for interrupting torque between the drive-motor and the transmission, or between the transmission and the differential, for example, for extended operation under a power source other than the drive-motor. For example, a four-wheel-drive vehicle may include such interrupt means to separate the motor and/or the transmission from the drive wheels while another drive-motor is powering the vehicle via another pair of drive wheels. Such an arrangement would eliminate inertial resistance induced by the moving components of the motor and transmission, and would reduce unnecessary wear. Applicants do not consider such interrupt means as being equivalent to a clutch or torque converter used for normal operation, and so consider vehicles employing such means as falling within the scope of the invention.

The term "uninterrupted" is used to indicate that, during normal operation of the drive-train, the input of the transmission rotates at a rate that is proportionate to the rotation of the output of the pump/motor, including during starting and stopping, shifting gears, acceleration, braking, cruising at speed, etc.

The diagram of FIG. 3 is not intended to comprehensively show all necessary features of the vehicle 160. Accordingly, components such as valves, sensors, actuators, control units, and electrical and mechanical couplings are not shown in detail. However, the operation of such features will be apparent in view of the present description, and is within the abilities of one having ordinary skill in the art.

In operation, the engine 162 of the vehicle 160 drives the pump 164, which draws low-pressure hydraulic fluid from the low-pressure accumulator 176 and pumps the fluid under high-pressure to be stored in the high-pressure accumulator 174. When in motor-mode, the drive-motor 180 receives pressurized fluid from the high-pressure accumulator 174 and converts the pressure to torque, or rotational force, which is transmitted to the transmission 182 via the coupling shaft 186. The spent hydraulic fluid is returned from the drive-motor 180 to the low-pressure accumulator 176. To operate the vehicle 160 in reverse direction, valves are activated to reverse the polarity of the fluid lines supplying pressure to the drive-motor 180, such that the drive-motor 180 generates rotational force counter to the forward rotation.

The drive-motor 180 may also be operated in pump-mode, in which rotational force created by the forward inertia of the vehicle is drawn from the drive wheels 172, through the transmission 182, to the drive-motor 180, where the kinetic energy of the moving vehicle 160 is used to draw low-pressure hydraulic fluid from the low-pressure accumulator 176 and pump the fluid under high-pressure to the high-pressure accumulator 174. This is commonly referred to as regenerative braking. More detailed discussions of principles of the operation of a hydraulic vehicle as briefly described above may be found in U.S. Pat. No. 6,719,080 and U.S. patent application Ser. No. 10/769,459, which documents are incorporated herein by reference in their entirety.

Figure 4A:
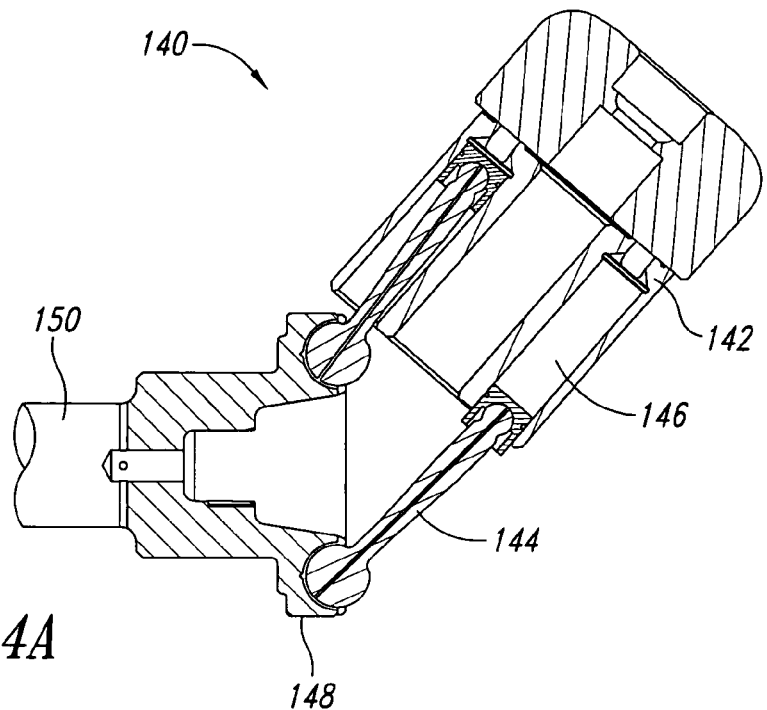
FIGS. 4A-4C show, in cross-section, the drive-motor of the vehicle of FIG. 3 at various stroke-angles.
Figure 4B:
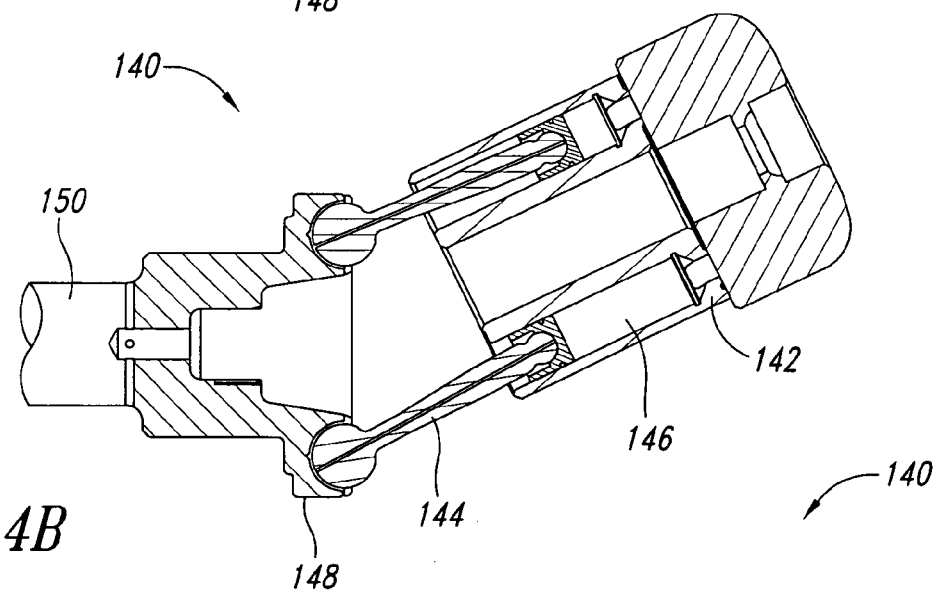
Figure 4C:
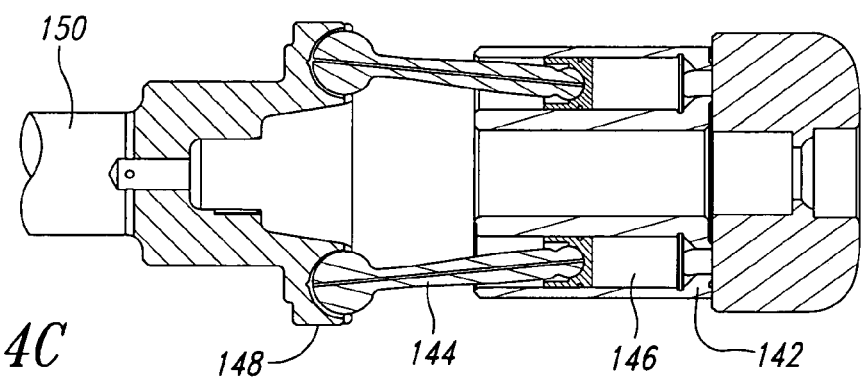

FIGS. 4A-4C illustrate some of the components of the drive-motor 180 according to one embodiment. The motor shown is sometimes referred to as a bent-axis pump/motor. Other hydraulic motors or pump/motors that may also serve as vehicle drive-motors are known in the art. These include, for example, swash plate, sliding back plate, and radial piston motors, among others.

The drive-motor 180 of FIGS. 4A-4C employs a rotating barrel 142 that is driven by pistons 144 in cylinders 146. As the barrel 142 rotates, each cylinder 146, in turn, is subjected to high-pressure fluid, driving the respective piston 144 outward against a thrust plate 148 and contributing to the rotational force of the output shaft 150. As the barrel 142 continues to rotate, each cylinder 146, in turn, is vented to low pressure, allowing the respective piston 144 to retract in the cylinder 146.

The amount of force transferred from the high-pressure fluid to the rotation of the output shaft 150 is directly related to the angle of the barrel 142 relative to the thrust plate 148 and output shaft 150, sometimes referred to as the stroke-angle. When the barrel 142 is at a maximum stroke-angle, as shown in FIG. 4A, the drive-motor 180 is at maximum, or 100%, displacement, and a high degree of force is transferred from the high-pressure fluid to the rotation of the output shaft 150. A lower stroke-angle, as shown in FIG. 4B, results in a lower displacement, and hence a lower degree of force transfer. When the barrel 142 is at a zero angle of rotation, as shown in FIG. 4C, the drive-motor 180 is at minimum, or 0%, displacement, and receives no motive force from the high-pressure fluid, but is free to coast under its own inertia or by other forces acting on its output shaft 150.

When a vehicle operator applies pressure to the accelerator, the barrel 142 is moved to a higher stroke-angle, and when the operator fully releases the accelerator, the barrel is moved to a zero stroke-angle.

Unlike an internal combustion engine, the drive-motor 180 can be allowed to stop rotation, completely, without a complex restart procedure. Additionally, the drive-motor 180 is configured to be reversible, that is, to be capable of providing rotational force in either direction. As explained above, this is accomplished by simply reversing the flow of pressurized hydraulic fluid.

A more detailed discussion regarding the operation and structure of hydraulic pump/motors may be found in U.S. patent application Ser. No. 10/379,992, entitled HIGH-EFFICIENCY, LARGE ANGLE, VARIABLE DISPLACEMENT HYDRAULIC PUMP/MOTOR, and Ser. No. 10/795,797, entitled EFFICIENT PUMP/MOTOR WITH REDUCED ENERGY LOSS, which applications are incorporated herein by reference, in their entirety.

The maximum output torque that the drive-motor 180 is capable of producing is controlled by several factors. These include dimensions of the cylinders 146, the maximum possible stroke-angle of the barrel 142 relative to the thrust plate 148, and the degree of pressure differential between the high-pressure fluid source and the low-pressure fluid source.

The inventors have recognized that output inertia generated by the drive-motor 180 is largely determined by the mass and dimensions of the rotating portions of the motor 140, including the output shaft 150, the thrust plate 148, the pistons 144, and the barrel 142. On the other hand, neither the maximum stroke-angle, nor the fluid pressure differential has a significant effect on the inertia generated. Thus, a hydraulic motor having a given maximum torque capacity can be designed to generate a reduced output inertia by reducing the diameters of the cylinders 146, which in turn allows the reduction in the overall diameter and mass of the barrel 142, the pistons 144, and the thrust plate 148, while at the same time increasing the pressure differential of the hydraulic fluid, and/or increasing the maximum possible stroke-angle of the barrel 142, to compensate for the reduction in the dimensions of the cylinders 146. Such a motor may be referred to as a low-inertia motor.

In view of the above, the inventors have also recognized that a hydraulic motor can be designed in which the output inertia generated by the rotating portions of the motor is similar to the output inertia generated by a clutch plate of a clutch having a sufficient size to function in a vehicle employing an internal combustion engine with a maximum torque capacity substantially equal to that of the hydraulic motor.

It will be recognized that a vehicle of a given mass requires a drive-motor capable of efficiently moving that mass. Thus, larger vehicles require motors having a greater maximum torque capacity. In the case of traditional motor vehicles employing internal combustion engines, the minimum capacity of a torque interrupt device, such as a clutch, is dictated by the maximum torque capacity of the associated engine, in combination with the mass of the associated vehicle. A more powerful engine will demand a larger clutch, especially when employed to drive a more massive vehicle. The larger clutch will have a larger clutch plate, which will generate a correspondingly greater output inertia. In turn, synchronizers in an associated transmission must be configured to be capable of compensating for the inertial load exerted by differences in rotation speed during shifting events. Such principles are well understood in the art, but their implications with respect to alternative drive-motors have not previously been fully considered.

The output inertia of the drive-motor 180 is significantly lower than that of an internal combustion engine of comparable torque output, and may be configured to be about the same as would be exerted by the spinning clutch plate of a diaphragm clutch, as described above. Thus, synchronizers such as are well known in the industry can be adapted to compensate for this relatively low inertia.

According to the embodiments described with reference to FIGS. 3-5C, the drive-motor 180 is directly coupled to the transmission 182 via the coupling shaft 186, without an intervening clutch. Accordingly, rotation of an output shaft of the drive-motor 180 is transmitted directly to an input shaft of the transmission 182 via the coupling shaft 186.

When a gear change is required, the drive-motor 180 is "destroked," or rotated to a zero angle as described with reference to FIGS. 4A-4C. This substantially eliminates motive force from the drive-motor 180 to the transmission 182, and the vehicle 160 is effectively coasting as though a clutch were engaged. The gears of the transmission 182 are then changed, and the drive-motor 180 is stroked back to a desired level of power.

Figure 5A:
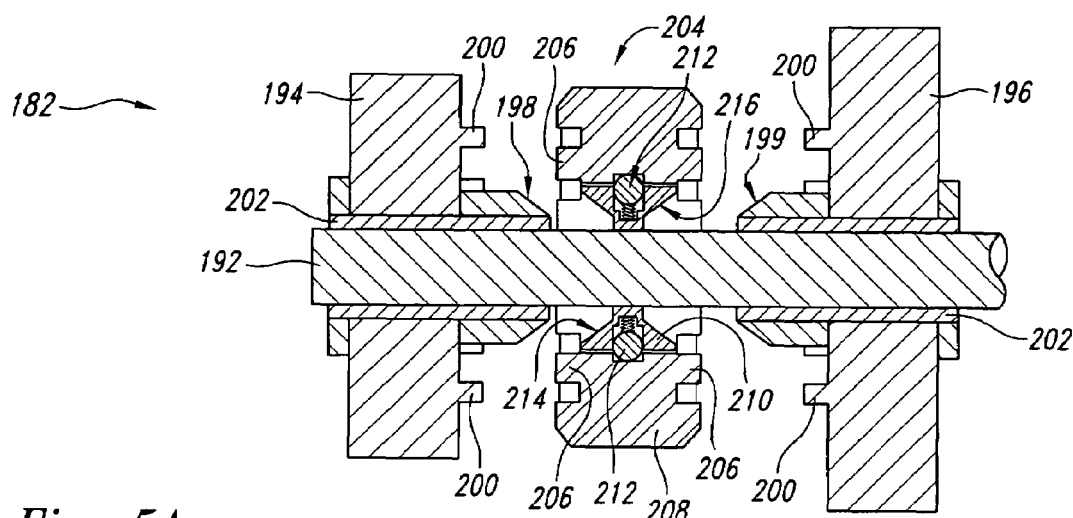
FIGS. 5A-5C show, in cross-section, a portion of the transmission of the vehicle of FIG. 3, including a synchronizer illustrated at progressive stages of engagement.
Figure 5B:
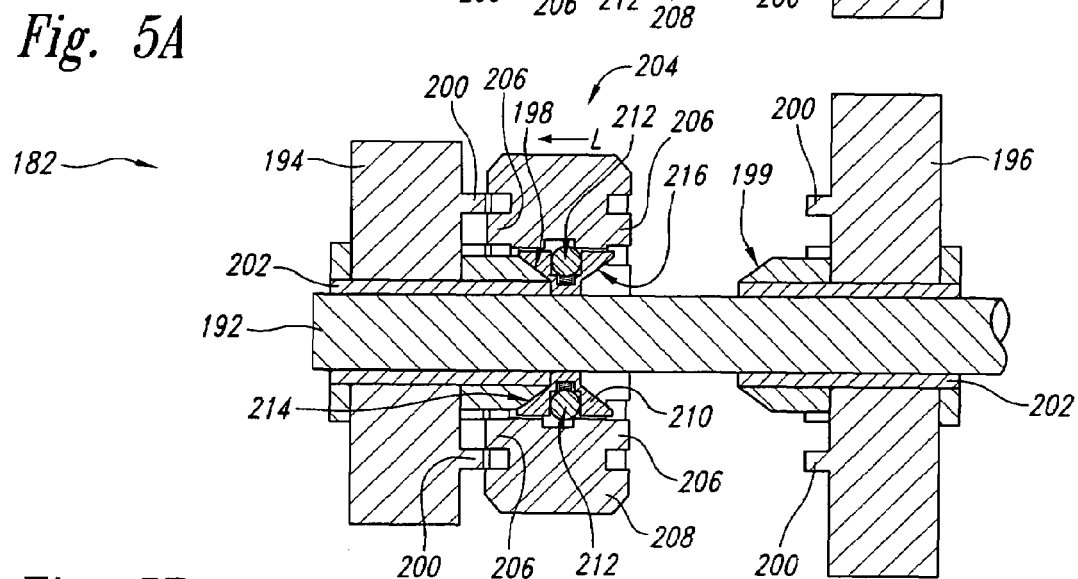
Figure 5C:
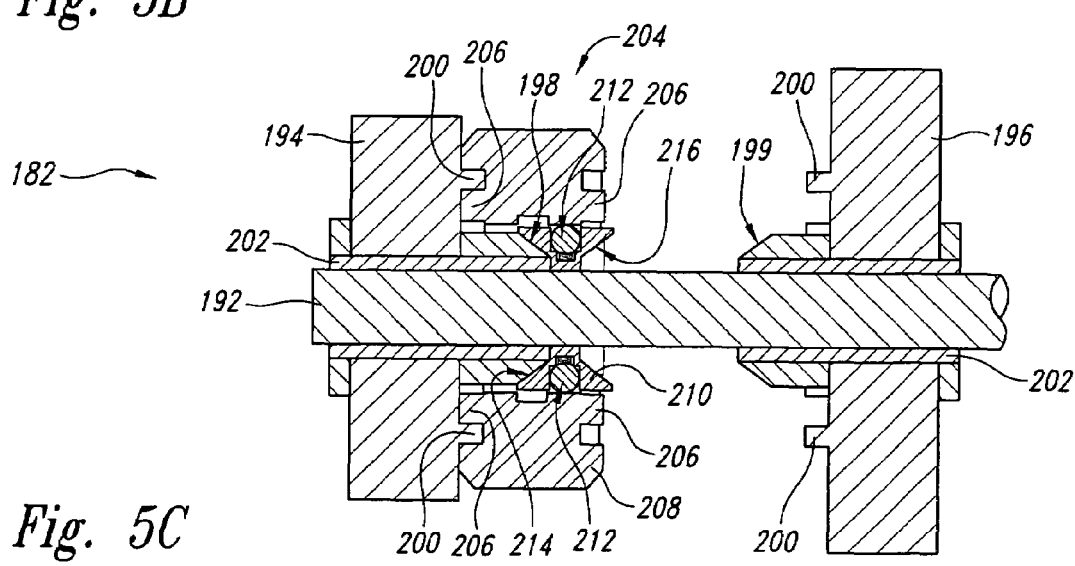

FIGS. 5A-5C illustrate, in cross-section, a simplified view of a portion of transmission 182, according to an embodiment of the invention. The transmission 182 includes a lay shaft 192 having first and second transmission gears 194, 196 positioned thereon. Each of the transmission gears 194, 196 includes a respective frusto-conical friction surface 198, 199 and a respective plurality of dog teeth 200. The first and second transmission gears 194, 196 are provided with bearings 202 through which the lay shaft 192 passes. Accordingly, the gears 194, 196 rotate freely, independent of rotation of the shaft 192. A synchronizer 204 is positioned on the lay shaft 192 between the first and second transmission gears 194, 196. The synchronizer 204 comprises an outer collar 208 having a plurality of dog teeth 206, and an inner collar 210. The inner collar 210 is slideably splined to the lay shaft 192 such that the synchronizer 204 is rotationally locked with the lay shaft 192, but is free to slide laterally thereon. The inner collar 210 is also splined with the outer collar 208 such that the inner and outer collars 210, 208 are rotationally locked. The lateral relationship between the inner and outer collars 210, 208 is maintained by ball detent mechanisms 212, as shown. The inner collar 210 also includes first and second frusto-conical friction surfaces 214, 216.

FIG. 5A shows the transmission 182 in a neutral position. The lay shaft 192 is coupled via a series of gears (not shown), an input shaft of the transmission 182, and the coupling shaft 186 to the drive-motor 180, such that the lay shaft 192 rotates at a rate that is proportionate to a rate of rotation of the drive-motor 180. Meanwhile, the first and second gears 194, 196 cooperate with respective companion gears (also not shown) that are coupled to the output shaft 188 of the transmission 182 such that the first and second gears 194, 196 rotate at rates that are proportionate to a rate of a rotation of the output shaft 188. The exact proportions of rotation are determined by the respective gear ratios of the first gear 194 and its companion gear, and the second gear 196 and its companion gear, as is well known in the art. Each of the first and second gears 194, 196, together with its respective companion gear, forms a respective gear set.

When a gear change is selected, for example from the second gear 196 to the first gear 194, drive-motor 180 is destroked, i.e., moved to the zero displacement position as illustrated in FIG. 4C. In this position, the barrel 142, thrust plate 148, and output shaft 150 of the drive-motor 180, together with the lay shaft 192 and any intervening coupling components, are rotating under their own inertia, without any compulsion from the drive-motor 180. With the drive-motor 180 at a zero stroke-angle, the synchronizer 204 is slid laterally from engagement with the second gear 196 to the neutral position, as shown in FIG. 5A.

While in the neutral position there is no transfer of rotational energy between the drive-motor 180 and the output shaft 188 of the transmission 182. As the gear change progresses, the synchronizer 204 is slid in direction L along the lay shaft 192 toward the first gear 194 until the first frusto-conical friction surface 214 of the inner collar 210 makes contact with the frusto-conical friction surface 198 of the first gear 194, as shown in FIG. 5B. As lateral pressure in direction L is applied to the synchronizer 204, the ball detent mechanism 212 of the inner collar 210 resists displacement within the outer collar 208, creating a strong frictional engagement between the friction surfaces 198, 214. The inertia of the moving vehicle 160 is transferred from the drive wheels 172, through the differential 184, to the output shaft 188 of the transmission 182, and thence via the first gear 194 to the synchronizer 204.

The progressively increasing friction between surfaces 198, 214 transfers rotational energy from the first gear 194 to the lay shaft 192 and finally to the freely rotating portions of the drive-motor 180, synchronizing the various components of the drive-train.

As the lateral force on the synchronizer 204 continues, the inner collar 210 is further displaced within the outer collar 208, and the dog teeth 200 of the first gear 194 mesh with the dog teeth 206 of the synchronizer 204, as shown in FIG. 5C, thereby rotationally locking the first gear 194 with the lay shaft 192. At this point, the drive-motor 180 is restroked to a desired position. Rotational force is again applied to the output shaft of the drive-motor 180 and is transmitted through the coupling of the synchronizer 204 with the first gear 194 to the output shaft of the transmission 182, and thence to the drive wheels 172.

When it is desired to shift from the first gear 194 to the second gear 196, the procedure described above is performed in reverse and the synchronizer 204 is moved laterally toward the second gear 196 and engaged therewith as described above.

It will be appreciated that the shifting procedure described above is substantially simpler than a conventional manual gear shift procedure, inasmuch as there is no need to engage a clutch. From the point of view of the operator, one merely releases the accelerator, moves the shift lever to the desired gear position, and reapplies acceleration.

The term "engage" is used in this specification to refer to the mechanical coupling of components, such as a synchronizer with a gear set, for example. However, the term is also used in a more general sense to refer to an action that follows selection of a gear ratio. Thus, for example, "engaging second gear" refers to the action of configuring a transmission to transmit motive force through a series of gear exchanges designated as second gear. Use of the term in this manner is common in this art.

The synchronizer 204 has been described as a single unit. However, it may be seen that the synchronizer 204 includes separate surfaces 214, 216 configured to engage respective friction surfaces 198, 199 of the first and second gears 194, 196. Accordingly, it may be considered that the synchronizer 204 comprises first and second synchronizers configured to synchronize respective gears. Furthermore, there is a wide variety of synchronizer designs known in the art, all of which are considered to fall within the scope of the invention.

Figure 6:
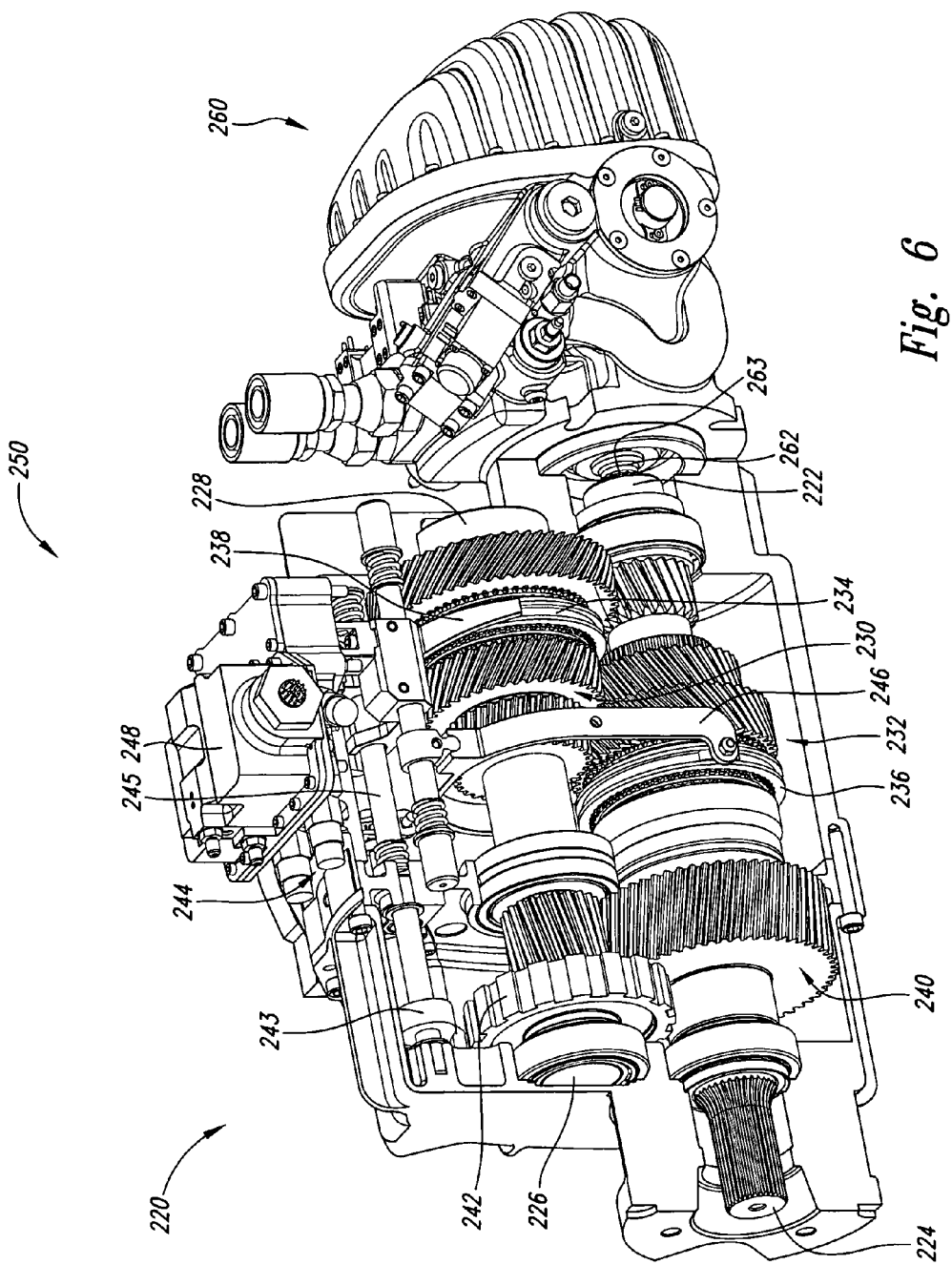
FIG. 6 illustrates a portion of a vehicle drive-train, according to another embodiment of the invention.

Referring now to FIG. 6, a portion of a vehicle drive-train 250 is shown, including a transmission 220 and a pump/motor 260. The pump/motor 260 includes an output shaft 262 coupled directly, via a splined engagement 263, to an input shaft 222 of the transmission 220. The transmission 220 further includes an output shaft 224, a lay shaft 226, and first, second, and third gear sets 228, 230, 232, each having upper and lower gears at, respectively, first, second, and third gear ratios.

The lower gears of the first and second gear sets 228, 230 are rotationally locked to the input shaft 222, while the lower gear of the third gear set 232 is rotatably coupled to the input shaft 222, such that it can rotate independent of the input shaft 222. Meanwhile, the upper gears of the first and second gear sets 228, 230 are rotatably coupled to the lay shaft 226, while the upper gear of the third gear set 232 is rotationally locked to the lay shaft 226. An output gear set 240 is rotationally locked to both the output shaft 224 and the lay shaft 226, such that rotation of the lay shaft 226 is proportionate to rotation of the output shaft 224.

A first synchronizer 234 includes first and second synchronizing surfaces configured to selectively engage corresponding surfaces of the upper gears of the first and second gear sets, respectively, rotationally locking the selected gear to the lay shaft 226. Second synchronizer 236 includes a single synchronizing surface configured to engage a corresponding face on the lower gear of the third gear set to selectively lock rotation of the lower gear of the third gear set 232 to the input shaft 222. The transmission 220 further includes a gear selection mechanism 244 comprising a plurality of shift rails 245 and first and second shifting forks 238, 246 configured to actuate synchronizers 234, 236, respectively. According to the embodiment of FIG. 6, a shift controller 248 is configured to operate the shifting mechanism for the purpose of changing gears. A parking gear 242 is provided on the lay shaft 226 and a parking pawl 243 is configured to engage the parking gear 242 when selected.

Rotational force from the output shaft 262 of the pump/motor 260 is transmitted to the input shaft 222 of the transmission 220. The rotational force is selectively transmitted via the first, second, or third gear sets 228, 230, 232 to the lay shaft, in accordance with the selected positions of the first and second synchronizers 234, 236. The rotational force is thence transferred via the output gear set 240 to the output shaft 224, which is configured to be coupled to a vehicle drive shaft.

It may be seen that the drive-train 250 of the present embodiment may be distinguished from a typical drive-train in several respects. The drive-train 250 does not include a clutch between the drive-motor 260 and the transmission 220, which are instead directly coupled. As described above, the pump/motor 260 is configured to produce a sufficiently low output inertia that the first and second synchronizers 234, 236 of the transmission 220 are adequate to compensate for differences of rotation speed between components of the transmission 220 during shifting, thus obviating the need for a clutch. The transmission 220 also differs from a typical transmission in that it does not include a reverse gear. Inasmuch as the pump/motor 260 is capable of reversing direction, no reverse gear is required.

The embodiment pictured is configured to operate as an automatic transmission, with the shift controller 248 being operated by a logic controller to select gear ratios and shift timing. However, according to another embodiment, the drive-train 250 may be configured to be operated as a manual transmission, with a standard gear shift coupled to the shift mechanism 244 in a known manner.

A drive-train according to the described invention has fewer moving parts and lower weight than comparable drive-trains according to previously known art. Such a drive-train can be employed in automatic-transmission vehicles, as well as manual, and automatic-manual transmissions.

Various embodiments of the invention have been shown in which a hydraulic motor acts as a vehicle drive-motor. According to another embodiment, an electric motor is employed in a manner similar to that described with reference to the hydraulic motor. Other motive power sources may also be applicable.

In those embodiments in which a transmission is shifted automatically, there are various shift strategies that may be employed, some of which are described hereafter, with reference to a drive-train employing a variable-displacement hydraulic pump/motor. Equivalent strategies for use with a drive-train employing an electric motor will be evident to one of ordinary skill, given the present disclosure.

A shift controller may be configured to upshift the transmission (i.e., from a second gear to a third gear) if the drive-motor remains below a selected percentage of its maximum displacement for a selected period. For example, if the drive-motor remains below 30% of its maximum displacement for more than 3 seconds, the controller may be programmed to shift to the next gear.

A shift controller may be configured to upshift the transmission if the drive-motor output shaft exceeds a selected rpm, such as 4,500, for example.

A shift controller may be configured to upshift the transmission in accordance with another criterion, provided the upshift will not result in a displacement of greater than a selected displacement, for example 80% or 90%.

A shift controller may be configured to downshift the transmission if the current displacement is greater than a selected percentage of its maximum displacement for a selected period, and the downshift will not result in a shaft speed exceeding a selected rpm. For example, the selected percentage may be 90% or 100%, the selected period may be 0, 1, or 2 seconds, and the selected rpm may be 3,000 or 3,500 rpm.

A shift controller may be configured to downshift the transmission at the beginning of a braking event if the downshift will not result in a shaft speed exceeding a selected rpm, such as 4,000 rpm.

A shift controller may be configured never to shift during a braking event.

The various shifting strategies outlined above are described with reference to a shift controller. Such a controller may comprise a computer module in which appropriate instructions are provided as software programming, hardwired circuitry, or a combination of both. Additionally, the module may be a single component, a plurality of cooperating components, or a device configured to manage other aspects of the vehicle operation as well. Alternatively, the shift controller may include mechanical components configured to fulfill some or all of the functions required to control shifting of the transmission.

According to an embodiment of the invention, the shift controller is configured to be selectively controlled. for example, the shift controller may have programming for a variety of shift strategies from which an operator of the vehicle may select according to a desired level of vehicle economy, comfort, or performance.

For the purposes of this specification, a transmission gear ratio is the ratio of rotation of the input shaft relative to rotation of the output shaft. Gear changes of a transmission are typically numbered, ascending from first gear, in descending order of input to output ratio. However, ordinal numbers such as first and second, as used in the claims of the present disclosure, are used according to conventional claim practice. Thus, for example, a claim reciting a transmission having first and second gear ratios reads on any transmission having at least two gear ratios, without limitation to a maximum number of gear ratios or to which of all of the ratios of the transmission is "first" or "second."

On the other hand, reference in the specification or claims to an upshift of the transmission signifies a shift from a gear or first combination of gear elements having a first input to output ratio, to a second gear or combination of gear elements having a second input to output ratio, lower than the first ratio; and a reference in the specification or claims to a downshift of the transmission signifies a shift from a first combination of gear elements, having a first output to input ratio, to a second combination of gear elements, having a second output to input ratio, greater than the first ratio.

When used in the claims, the term "output inertia" refers to an inertia that is developed by moving parts of an engine, a motor, or a clutch, that is transmitted to an output shaft in the form of torque, independent of other power that may be applied to the shaft.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A vehicle drive-train, comprising:
   a hydraulic drive-motor having an output shaft;
   a high-pressure hydraulic accumulator hydraulically coupled to the drive-motor; and
   a transmission having an input shaft, an output shaft, a plurality of discrete forward gear ratios and a corresponding plurality of synchronizers, each of the synchronizers configured to mechanically synchronize rotation of the drive-motor output shaft with the transmission output shaft according to a value of a respective one of the gear ratios during shifting of the transmission to the respective gear ratio, the output shaft of the drive-motor and the input shaft of the transmission being coupled together such that, during normal operation of the drive-train, rotation of the output shaft of the drive-motor results in a proportionate and uninterrupted rotation of the input shaft of the transmission.

2. The drive-train of claim 1 wherein the coupling of the output shaft of the drive-motor and the input shaft of the transmission is in the form of a unitary shaft comprising both the output shaft of the drive-motor and the input shaft of the transmission.

3. The drive-train of claim 1 wherein the coupling of the output shaft of the drive-motor and the input shaft of the transmission is a splined engagement between the output shaft of the drive-motor and the input shaft of the transmission.

4. The drive-train of claim 1 wherein the coupling of the output shaft of the drive-motor and the input shaft of the transmission comprises a reducing gear set such that the input shaft of the transmission rotates at a ratio that is less than 1:1, with respect to rotation of the output shaft of the drive-motor.

5. The drive-train of claim 1 wherein each of the plurality of synchronizers includes friction surfaces configured to engage prior to engagement of gears of the respective gear ratio.

6. The drive-train of claim 1 wherein the transmission includes a lay shaft.

7. The drive-train of claim 1 wherein the drive-motor is a variable displacement hydraulic motor.

8. The drive-train of claim 1 wherein the drive-motor is an electric motor.

9. The drive-train of claim 1 wherein the drive-motor is a hydraulic pump/motor.

10. A method, comprising:
    drawing power from a power storage device to apply torque to an output shaft of a hydraulic drive-motor of a vehicle;
    removing torque from the output shaft of the hydraulic drive-motor;
    shifting a transmission of the vehicle from a first forward gear ratio to a second forward gear ratio; and
    during the shifting step, bringing first and second friction surfaces in the transmission into contact, thereby synchronizing rotation of the output shaft of the drive-motor with an output shaft of the transmission, according to the second forward gear ratio.

11. The method of claim 10 wherein the removing step includes reducing displacement of the hydraulic drive-motor to a minimum displacement.

12. The method of claim 10 wherein the vehicle is a passenger vehicle.

13. The method of claim 10 wherein the vehicle is a cargo vehicle.

14. The method of claim 10, further comprising placing the hydraulic drive-motor in pump mode and using rotational force from the drive wheels to pump hydraulic fluid at high-pressure to the power storage device.

15. A vehicle, comprising:
    a hydraulic drive-motor including an output shaft;
    a power output device;

means for storing power from the power output device; and a transmission having an output shaft, and an input shaft uninterruptedly coupled to the output shaft of the drive-motor, the transmission having a plurality of gear elements that provide the transmission with a plurality of forward gear ratios, and a synchronizer that selectively and mechanically engages a selected one of the plurality of gear elements for operation of the vehicle at a corresponding one of the plurality of forward gear ratios.

16. The vehicle of claim 15 wherein the vehicle is a passenger vehicle.

17. The vehicle of claim 15 wherein the vehicle is a cargo vehicle.

18. The vehicle of claim 15, further comprising:
a differential coupled to the output shaft of the transmission; and
an internal combustion engine coupled to the power output device.

19. The vehicle of claim 18 wherein the power output device is a hydraulic pump, and the storage means comprises a high-pressure hydraulic fluid accumulator.

20. The vehicle of claim 15 wherein the drive motor is a variable-displacement hydraulic motor.

21. The vehicle of claim 15, further comprising a shift controller configured to automatically select an operating gear ratio from among the plurality of gear ratios in accordance with selected shifting criteria.

22. The vehicle of claim 21 wherein the shift controller is configured to upshift the transmission when the drive-motor is operated below a selected percentage of its maximum output torque for a selected period.

23. The vehicle of claim 21 wherein the shift controller is configured to upshift the transmission if the drive-motor output shaft exceeds a selected rpm.

24. The vehicle of claim 21 wherein the shift controller is configured to upshift the transmission in accordance with another criterion, provided the upshift will not result in an output torque of the drive-motor of greater than a selected value.

25. The vehicle of claim 21 wherein the shift controller is configured to downshift the transmission if a current output torque of the drive-motor is greater than a selected percentage of its maximum output torque for a selected period, and the downshift will not result in a drive-motor output shaft speed exceeding a selected rpm.

26. The vehicle of claim 21 wherein the shift controller is configured to downshift the transmission at the beginning of a braking event if the downshift will not result in a drive-motor output shaft speed exceeding a selected rpm.

27. The vehicle of claim 21 wherein the shift controller is configured never to shift during a braking event.

28. The vehicle of claim 27 wherein the hydraulic drive-motor is a pump/motor capable of regeneratively braking the vehicle, and the transmission is configured to transmit rotational force from the drive wheels to the drive-motor to brake the vehicle.

29. The vehicle of claim 15 wherein the hydraulic drive-motor is a pump/motor capable of regeneratively braking the vehicle.

30. A vehicle drive-train, comprising:
a hydraulic drive-motor capable of having all motive force removed from an output shaft thereof during normal operation of the drive-train;
a high-pressure accumulator configured to store power in the form of pressurized hydraulic fluid;
a transmission having a plurality of forward gear ratios; and
synchronizing means for frictionally synchronizing the output shaft of the drive-motor with an output shaft of the transmission while shifting from a first one of the plurality of forward gear ratios to a second one of the plurality of forward gear ratios.

31. The vehicle drive-train of claim 30 wherein the synchronizing means includes first and second friction surfaces configured to be biased together during a shifting event.

32. The vehicle drive-train of claim 31 wherein the synchronizing means includes first and second sets of dog teeth configured to mesh once the output shaft of the drive-motor is synchronized with the output shaft of the transmission.

33. A drive-train, comprising:
a hydraulic motor having an output shaft and having an output inertia approximately equal to, or less than, an output inertia generated by a clutch plate of a clutch having a sufficient size to function in a vehicle employing an internal combustion engine with a maximum torque capacity substantially equal to that of the motor;
a power storage device configured to store power generated by a power output device and provide power to the motor; and
a transmission having an input shaft uninterruptedly coupled to the output shaft of the motor, the transmission further including an output shaft, a plurality of selectable forward gear ratios, and a synchronizer for each of the plurality of gear ratios.

34. The drive-train of claim 33, further comprising a shift controller configured to automatically select an operating gear ratio from among the plurality of gear ratios in accordance with selected shifting criteria.

* * * * *